(12) United States Patent
Tsujita et al.

(10) Patent No.: US 8,415,090 B2
(45) Date of Patent: Apr. 9, 2013

(54) PRODUCTION METHOD OF OPTICAL WAVEGUIDE FOR CONNECTOR

(75) Inventors: Yuichi Tsujita, Ibaraki (JP); Junichi Fujisawa, Ibaraki (JP); Kazunori Mune, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/235,932

(22) Filed: Sep. 19, 2011

(65) Prior Publication Data

US 2012/0077129 A1    Mar. 29, 2012

(30) Foreign Application Priority Data

Sep. 28, 2010   (JP) ................................ 2010-217372

(51) Int. Cl.
    *G03F 7/20*     (2006.01)
(52) U.S. Cl.
    USPC .......................................... 430/321; 430/330
(58) Field of Classification Search ........................ None
    See application file for complete search history.

(56) References Cited

U.S. PATENT DOCUMENTS

| | | | |
|---|---|---|---|
| 7,330,612 B2 | 2/2008 | Nakashiba et al. | |
| 7,400,809 B2 | 7/2008 | Erben et al. | |
| 8,187,796 B2* | 5/2012 | Hikita et al. | 430/321 |
| 2002/0021879 A1 | 2/2002 | Lee et al. | |
| 2004/0013953 A1* | 1/2004 | Mune et al. | 430/18 |
| 2005/0018988 A1 | 1/2005 | Shih et al. | |
| 2006/0067622 A1 | 3/2006 | Hayashi et al. | |
| 2007/0189661 A1 | 8/2007 | Nakashiba et al. | |
| 2008/0107881 A1 | 5/2008 | Nakashiba et al. | |
| 2008/0113168 A1 | 5/2008 | Nakashiba et al. | |
| 2009/0286187 A1 | 11/2009 | Hodono et al. | |
| 2009/0305170 A1 | 12/2009 | Shimizu | |
| 2010/0067849 A1 | 3/2010 | Hikita et al. | |
| 2010/0068653 A1 | 3/2010 | Fujisawa et al. | |
| 2010/0092893 A1 | 4/2010 | Fujisawa et al. | |
| 2011/0014575 A1* | 1/2011 | Hikita et al. | 430/321 |

FOREIGN PATENT DOCUMENTS

| | | |
|---|---|---|
| DE | 100 43 267 A1 | 3/2002 |
| DE | 101 03 273 A1 | 8/2002 |
| EP | 1 209 492 A1 | 5/2002 |

(Continued)

OTHER PUBLICATIONS

Bamiedakis, et al., "Low Loss and Low Crosstalk Multimode Polymer Waveguide Crossings for High-Speed Optical Interconnects", Conference on Lasers and Electro-Optics May 5-11, 2007 Baltimore, dated May 6, 2007, pp. 1-2, XP031230857. Cited in Extended European Search Report dated Jan. 8, 2013.

(Continued)

*Primary Examiner* — John A. McPherson
(74) *Attorney, Agent, or Firm* — Westerman, Hattori, Daniels & Adrian, LLP

(57) ABSTRACT

A production method of an optical waveguide for a connector is provided, which reduces an optical coupling loss. Cores are formed in a crossing pattern, a branched pattern or a linear pattern, and then an over-cladding layer formation photosensitive resin layer is formed over the cores. In turn, a heat treatment is performed at a temperature of 70° C. to 130° C. to properly form mixed layers in interfaces between the cores and the photosensitive resin layer. By thus forming the mixed layers, the connector optical waveguide can be produced as having a reduced optical coupling loss.

2 Claims, 9 Drawing Sheets

FOREIGN PATENT DOCUMENTS

| | | |
|---|---|---|
| EP | 2 133 716 A2 | 12/2009 |
| EP | 2 278 366 A1 | 1/2011 |
| JP | 11-183747 A | 7/1999 |
| JP | 2004-341454 A | 12/2004 |
| JP | 2009-103827 A | 5/2009 |
| JP | 2009-276724 A | 11/2009 |
| JP | 2010-66667 A | 3/2010 |
| JP | 2010-72314 A | 4/2010 |
| JP | 2010-117380 A | 5/2010 |
| WO | 92/13726 A1 | 8/1992 |
| WO | 2006-062781 A1 | 6/2006 |
| WO | 2009/073404 A1 | 6/2009 |

OTHER PUBLICATIONS

Extended European Search Report dated Jan. 8, 2013, issued in corresponding European Patent Application No. 11182149.2.

European Search Report dated Nov. 25, 2010, issued in corresponding European Patent Application No. 10169646.6.

* cited by examiner

RELATED ART

PRODUCTION METHOD OF OPTICAL WAVEGUIDE FOR CONNECTOR

BACKGROUND OF THE INVENTION

1. Field of the Invention

The present invention relates to a production method of a film-shaped optical waveguide for a connector which connects components (e.g., information processing components, information transmitting components and the like) to each other for light transmission between these components.

2. Description of the Related Art

Optical waveguides for connectors typically include an under-cladding layer, cores provided on a surface of the under-cladding layer and serving as optical paths, and an over-cladding layer provided over the cores.

On the other hand, where an optical waveguide having optical interconnections (cores) of a predetermined linear pattern is provided on a surface of an electric circuit board having electric wirings in an opto-electric hybrid board, the optical waveguide is produced in the following manner. As shown in FIG. 10A, an under-cladding layer 31 is formed on a surface of an electric circuit board 20 opposite from an electric circuit formation surface on which an electric circuit 21 is provided. In turn, as shown in FIG. 10B, cores 32 are formed in a predetermined pattern on a surface of the under-cladding layer 31 by a photolithography process. Then, as shown in FIG. 10C, an over-cladding layer photosensitive resin is applied over the cores 32 on the surface of the under-cladding layer 31 to form a photosensitive resin layer 33A. Subsequently, a heat treatment is performed to increase the temperature of the photosensitive resin layer 33A to evaporate a solvent contained in the photosensitive resin layer 33A. At this time, as shown in FIG. 10D, a photosensitive resin component of the photosensitive resin layer 33A penetrates into a surface portion of each of the cores 32 to form a mixed layer 34 composed of a mixture of the photosensitive resin component and the core material. Thereafter, the photosensitive resin layer 33A is exposed by irradiation with radiation, whereby an over-cladding layer 33 is formed from the photosensitive resin layer 33A. Thus, the optical waveguide 30 is produced on the surface of the electric circuit board 20 to provide the opto-electric hybrid board (see, for example, JP-A-2009-103827).

The refractive index of the mixed layer 34 formed in the over-cladding layer forming step is intermediate between the refractive index of the core 32 and the refractive index of the over-cladding layer 33, and is lower than the refractive index of the core 32. Therefore, light in the core 32 is less liable to pass through the mixed layer 34 formed in the surface portion of the core 32, so that the intensity of light transmitted through the mixed layer 34 is much lower than the intensity of light transmitted through a portion of the core 32 inside the mixed layer 34. This prevents scattering of light on a surface of the core 32, thereby reducing the light transmission loss.

However, if components (e.g., information processing components or the like) are connected to each other via a film-shaped connector optical waveguide produced by forming an over-cladding layer in the same manner as the over-cladding layer 33 of the opto-electric hybrid board described above, it is sometimes impossible to properly transmit light between the components.

SUMMARY OF THE INVENTION

To cope with this, the cause of the impossibility of the proper light transmission between the components via the film-shaped connector optical waveguide was studied. The temperature of the heat treatment of the over-cladding layer photosensitive resin for the opto-electric hybrid board (at 140° C. for 30 minutes, see the paragraph [0071] in JP-A-2009-103'827) is too high for the film-shaped connector optical waveguide. More specifically, the mixed layer 34 occupies a higher percentage of the core 32 in the opto-electric hybrid board disclosed in JP-A-2009-103827, so that the area of a portion of the core 32 having a higher transmission light intensity is correspondingly reduced in the cross section of the core 32. In applications of the opto-electric hybrid board disclosed in JP-A-2009-103827, the cores 32 are formed in an unbendable state on a rigid substrate (electric circuit board 20). Therefore, even if the higher transmission light intensity portion has a smaller area, there is no problem. In applications of the connector optical waveguide, however, the components are connected to each other with their optical axes slightly misaligned (it is difficult to connect the components without the misalignment). Therefore, if the higher transmission light intensity portion has a smaller area, the light coupling loss of the connector optical waveguide is increased (the proper light transmission between the components is impossible). Further, the size of the mixed layer 34, which depends on the heat treatment temperature, is increased as the heat treatment temperature becomes higher.

In view of the foregoing, a connector optical waveguide production method is provided which reduces the optical coupling loss.

A production method of an optical wave guide for a connector includes the steps of: forming an under-cladding layer on a surface of a substrate; forming a core in a predetermined pattern on a surface of the under-cladding layer; forming an over-cladding layer formation photosensitive resin layer over the core; performing a heat treatment at a temperature of 70° C. to 130° C. to form a mixed layer of a mixture of a core material and a photosensitive resin layer material in an interface between the core and the photosensitive resin layer; exposing apart of the photosensitive resin layer by irradiation with radiation to form an over-cladding layer from the exposed part; and removing the substrate from the under-cladding layer to provide a film-shaped optical waveguide connector including the under-cladding layer, the core, the mixed layer and the over-cladding layer.

The term "film-shaped" of the film-shaped connector optical waveguide means that the optical waveguide has a thickness of 40 to 200 μm.

Formation of the mixed layer in the connector optical waveguide production method was studied in consideration of the results of the studies conducted to reduce the optical coupling loss of the connector optical waveguide. If the temperature of the heat treatment for the formation of the mixed layer is set at a lower level on the order of 70° C. to 130° C., it is possible to form the mixed layer while permitting the higher transmission light intensity portion of the core to have a sufficiently large area in the cross section of the core to ensure the function of the connector optical waveguide, and attained the present invention.

In the connector optical waveguide production method, the temperature of the heat treatment for the formation of the mixed layer in the interface between the core and the photosensitive resin layer is set at a lower level on the order of 70° C. to 130° C. This makes it possible to form the mixed layer in the interface between the core and the photosensitive resin layer while permitting the higher transmission light intensity portion of the core to have a sufficiently large area in the cross section of the core to ensure the function of the connector optical waveguide. Therefore, even if components are connected to each other via the thus produced connector optical waveguide with their optical axes slightly misaligned, the optical coupling loss can be reduced for proper light transmission between the components.

Particularly, where the heat treatment is performed for a period of 1 to 20 minutes, the mixed layer is optimized, thereby further reducing the optical coupling loss.

Where the core is formed in a crossing pattern, an optical excess loss occurring due to the crossing can be reduced.

Similarly, where the core is formed in a branched pattern, an optical excess loss occurring due to the branching can be reduced.

DETAILED DESCRIPTION OF THE INVENTION

With reference to the attached drawings, the present invention will hereinafter be described in detail by way of embodiments.

Figure 1A:
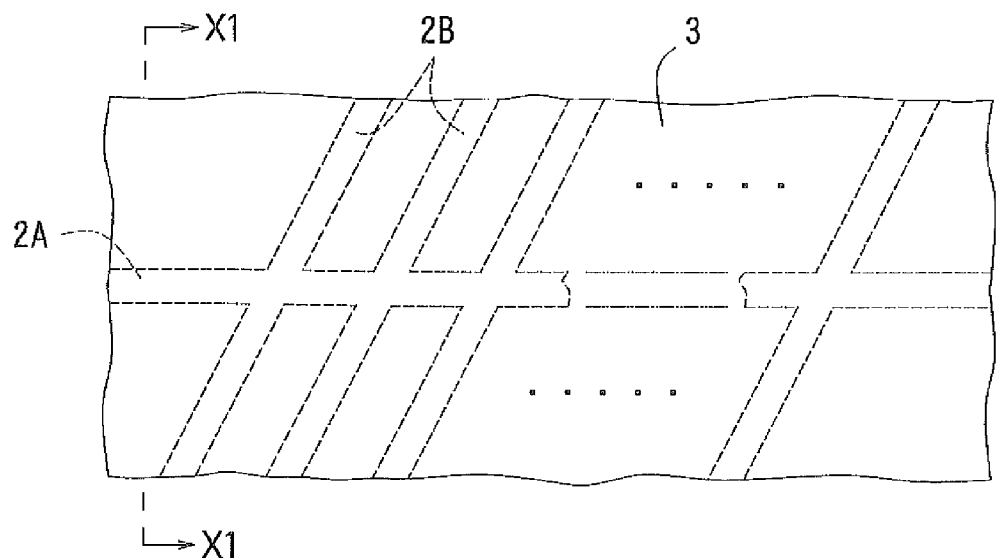
FIGS. 1A and 1B are a plan view and an enlarged X1-X1 sectional view, respectively, which schematically illustrate a connector optical waveguide produced by a connector optical waveguide production method according to a first embodiment.
Figure 1B:
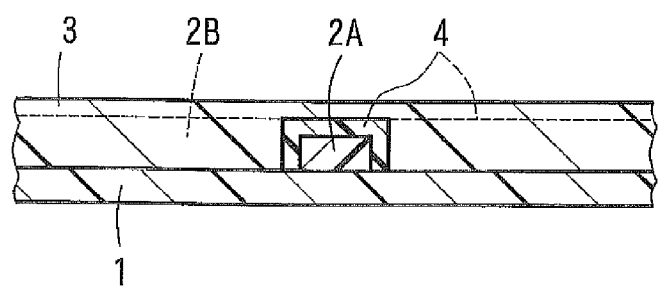

FIGS. 1A and 1B are a plan view and an enlarged X1-X1 sectional view, respectively, which schematically illustrate a connector optical waveguide produced by a connector optical waveguide production method according to a first embodiment. The connector optical waveguide includes an under-cladding layer 1, cores 2A, 2B provided in a crossing pattern on a surface of the under-cladding layer 1, and an over-cladding layer 3 provided over the cores 2A, 2B. The cores 2A, 2B include mixed layers 4 of a mixture of a core material and an over-cladding layer material provided in portions of the cores 2A, 2B adjacent to interfaces between the cores 2A, 2B and the over-cladding layer 3. In this embodiment, the crossing pattern of the cores 2A, 2B is such that a plurality of parallel cores 2B cross a single linear core 2A in the same plane.

Next, the connector optical waveguide production method according to this embodiment will be described in detail.

First, a planar substrate 10 (see FIG. 2A) to be used for formation of the under-cladding layer 1 is prepared. Exemplary materials for the substrate 10 include glass, resins such as polyethylene terephthalates (PET) and polyethylene naphthalates (PEN), metals such as stainless steel, quartz and silicon. The substrate 10 has a thickness of, for example, 20 μm to 1.5 mm.

Figure 2A:
FIGS. 2A to 2D are schematic diagrams for explaining the connector optical waveguide production method according to the first embodiment.

Then, as shown in FIG. 2A, the under-cladding layer 1 is formed on a surface of the substrate 10. A thermosetting resin composition or a photosensitive resin composition is used as a material for the under-cladding layer 1. Where the thermosetting resin composition is used, the formation of the under-cladding layer 1 is achieved by applying the thermosetting resin composition on the surface of the substrate 10, and then heating the applied thermosetting resin composition. Where the photosensitive resin composition is used, on the other hand, the formation of the under-cladding layer is achieved by applying the photosensitive resin composition on the surface of the substrate 10, and then exposing the applied photosensitive resin composition to radiation such as ultraviolet radiation. The under-cladding layer 1 has a thickness of, for example, 5 to 60 μm, preferably about 25 μm.

Figure 2B:
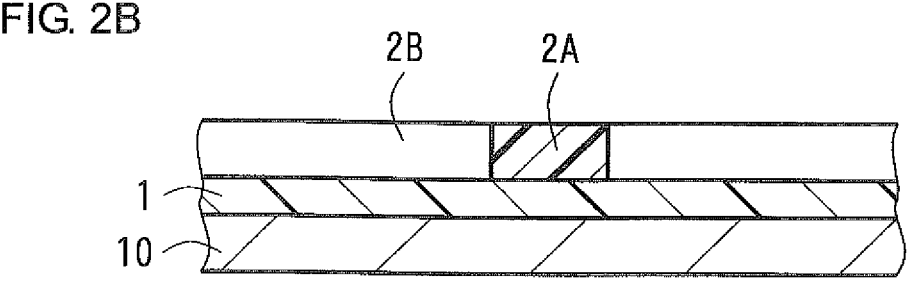
Figure 2C:
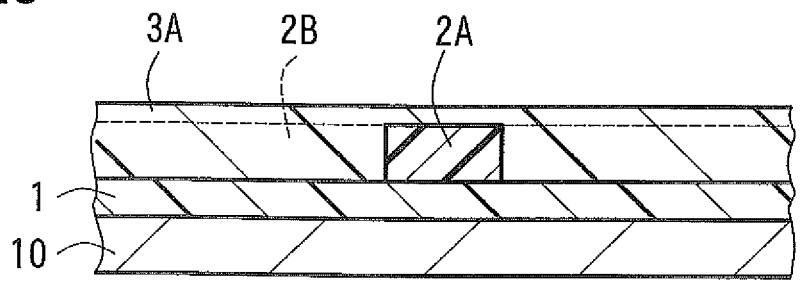

In turn, as shown in FIG. 2B, the cores 2A, 2B are formed in the crossing pattern (see FIG. 1A) on the surface of the under-cladding layer 1 by a photolithography process. A photosensitive resin composition, which is excellent in patternability, is preferably used as a material for the cores 2A, 2B. Examples of the photosensitive resin composition include photosensitive epoxy resin compositions, photosensitive acryl resin compositions and photosensitive oxetanyl resin compositions, which may be used either alone or in combination. The cores 2A, 2B each have a trapezoidal or rectangular cross section, which ensures excellent patternability. The cores 2A, 2B each have a thickness (height) of, for example, 30 to 80 μm, preferably about 50 μm. The cores 2A, 2B each have a width of, for example, 30 to 70 μm, preferably about 50 μm. The crossing pattern is, for example, such that one to thirty cores 2B cross a single core 2A at a crossing angle of 30 to 90 degrees.

The material for the cores 2A, 2B has a higher refractive index than the material for the under-cladding layer 1 and a material for the over-cladding layer 3 (see FIG. 2D) to be described later. The refractive index may be adjusted, for example, by selection of the types of the materials for the under-cladding layer 1, the cores 2A, 2B and the over-cladding layer 3 and adjustment of the composition ratio of the materials.

Subsequently, as shown in FIG. 21C, photosensitive resin layer TA for formation, of the over-cladding layer is formed over the cores 2A, 2B on the surface of the under-cladding layer 1. A material for the photosensitive resin layer 3A is a photosensitive resin composition, and examples of the photosensitive resin composition include photosensitive epoxy resin compositions, photosensitive acryl resin compositions and photosensitive oxetanyl resin compositions, which may be used either alone or in combination. The photosensitive resin composition may be of a solvent type which contains an organic solvent such as ethyl lactate for adjustment of the viscosity of the photosensitive resin composition, or may be of a non-solvent type which contains no organic solvent. The organic solvent is nonreactive with a photosensitive resin as a primary component of the photosensitive resin composition, and has a resin swelling/plasticizing effect. The formation of the photosensitive resin layer 3A is achieved by applying the photosensitive resin composition over the cores 2A, 2B on the surface of the under-cladding layer 1.

Figure 2D:
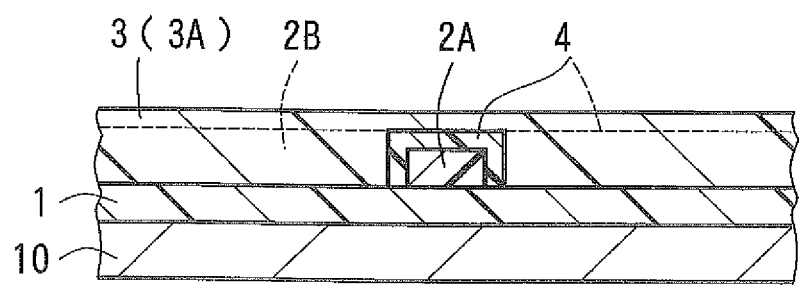

In turn, a heat treatment is performed at temperature of 70° C. to 130° C., whereby mixed layers 4 are formed in portions of the cores 2A, 2B of the crossing pattern adjacent to interfaces between the cores 2A, 2B and the photosensitive resin layer 3A as shown in FIG. 2D. That is, the heat treatment causes the over-cladding layer photosensitive resin composition applied in an uncured state to penetrate into the interfacial portions of the cores 2A, 2B to be thereby mixed with the core resin material. The interfacial portions, which are composed of a mixture of the over-cladding layer photosensitive resin composition and the core resin material, serve as the mixed layers 4. The thickness of each of the mixed layers 4 is controlled by the heat treatment temperature (i.e., the mixed layer thickness is increased with the heat treatment temperature). The mixed layer thickness is typically 2 to 20 μm. If the heat treatment temperature is lower than 70° C., it is impossible to properly form the mixed layers 4.

The heat treatment period is preferably 1 to 20 minutes, and more preferably 5 to 10 minutes. This ensures the proper formation of the mixed layers 4, thereby further reducing an optical coupling loss occurring when components (e.g., information processing components and the like) are connected to each other via the resulting connector optical waveguide.

After the mixed layers 4 are formed in this manner, the photosensitive resin layer 3A is exposed by irradiation with radiation, whereby the mixed layers 4 and the other portion of the photosensitive resin layer 3A are cured. Thus, the over-cladding layer 3 is formed. The over-cladding layer 3 has a thickness of, for example, 5 to 60 μm, preferably about 25 μm as measured from top surfaces of the cores 2A, 2B.

Then, the substrate 10 is removed from the under-cladding layer 1. Thus, the film-shaped connector optical waveguide (see FIGS. 1A and 1B) is produced, which includes the under-cladding layer 1, the cores 2A, 2B, the mixed layers 4 and the over-cladding layer 3. In the connector optical waveguide, the refractive index of the mixed layers 4 is intermediate between the refractive index of the cores 2A, 2B and the refractive index of the over-cladding layer 3, and is lower than the refractive index of the cores 2A, 2B. Therefore, light in the cores 2A, 2B is less liable to pass through the mixed layers 4 provided in the interfacial portions of the cores 2A, 2B, so that the intensity of light transmitted through the mixed layers 4 is much lower than the intensity of light transmitted through portions of the cores 2A, 2B inside the mixed layers 4. This prevents scattering of light on surfaces of the cores 2A, 2B, thereby reducing the light transmission loss. Further, the provision of the mixed layers 4 suppresses leak of light at intersections of the cores 2A, 2B, thereby significantly reducing the optical excess loss.

The light transmission loss herein means a light loss occurring when the light is transmitted through the cores, and a major cause of the light transmission loss is the scattering of the light on the surfaces of the cores. The optical excess loss herein means a light loss occurring due to the configuration of the core pattern, e.g., a crossing core pattern, a branched core pattern, a bent core pattern or the like. In general, the light is likely to partly leak out of the cores into the cladding layer at the intersections, branch points and bent portions of the cores, and the optical loss occurs due to the leak of the light.

In the first embodiment, the core pattern is such that the cores 2B each cross the core 2A at a single point, but may be such that three or more cores cross at a single point. The film-shaped connector optical waveguide has a thickness of, for example, 40 to 200 μm, preferably about 100 μm.

The connector optical waveguide having the cores 2A, 2B arranged in the crossing pattern is usable, for example, instead of a backplane for connection between circuit boards. For transmission of light between the circuit boards, the sequence of the cores 2A, 2B (optical interconnections) may be changed. Since the cores 2A, 2B are not arranged in a multi-level crossing pattern, it is possible to achieve the higher density integration of the optical interconnections, simplify the step of forming the optical interconnections, and reduce the thickness of the connector optical waveguide.

Figure 3A:
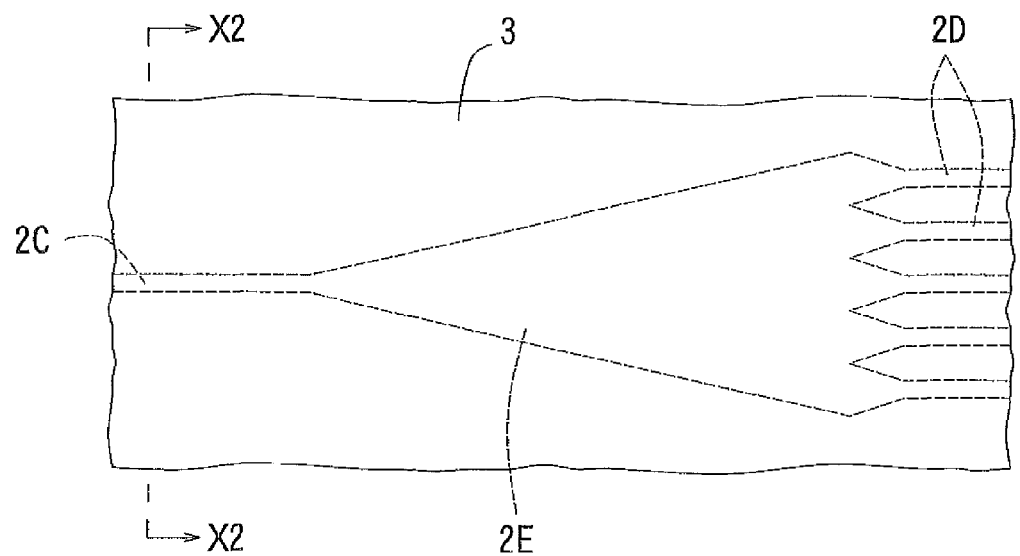
FIGS. 3A and 3B are a plan view and an enlarged X2-X2 sectional view, respectively, which schematically illustrate a connector optical waveguide produced by a connector optical waveguide production method according to a second embodiment.
Figure 3B:
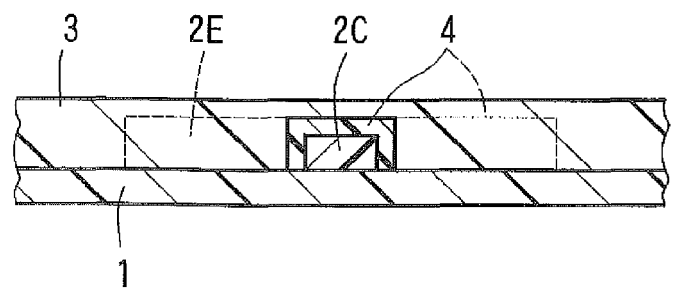

FIGS. 3A and 3B are a plan view and an X2-X2 sectional view, respectively, which schematically illustrate a connector optical waveguide produced by a connector optical waveguide production method according to a second embodiment. In the connector optical waveguide, a single core 2C is branched into a plurality of cores 2D (five cores 2D in FIG. 3A). In this embodiment, the branched pattern is such that a single core 2C having a constant width is connected at its distal end to a generally isosceles triangular portion 2E having a progressively increasing width, and the generally isosceles triangular portion 2E has a distal portion branched into a plurality of portions (five portions in FIG. 3A) which each have a progressively decreasing width and are respectively connected to cores 2D each having a constant width. The other components of the connector optical waveguide are the same as in the first embodiment shown in FIGS. 1A and 1B.

In this embodiment, the connector optical waveguide is produced as having mixed layers 4 in portions of the cores 2C, 2E, 2D of the branched pattern adjacent to interfaces between the cores 2C, 2E, 2D and the over-cladding layer 3 by the same method as shown in FIGS. 2A to 2D. The provision of the mixed layers 4 prevents scattering of light on surfaces of the cores 2C, 2E, 2D to reduce the light transmission loss, and suppresses leak of light at branch points of the cores to significantly reduce the optical excess loss.

Figure 4A:
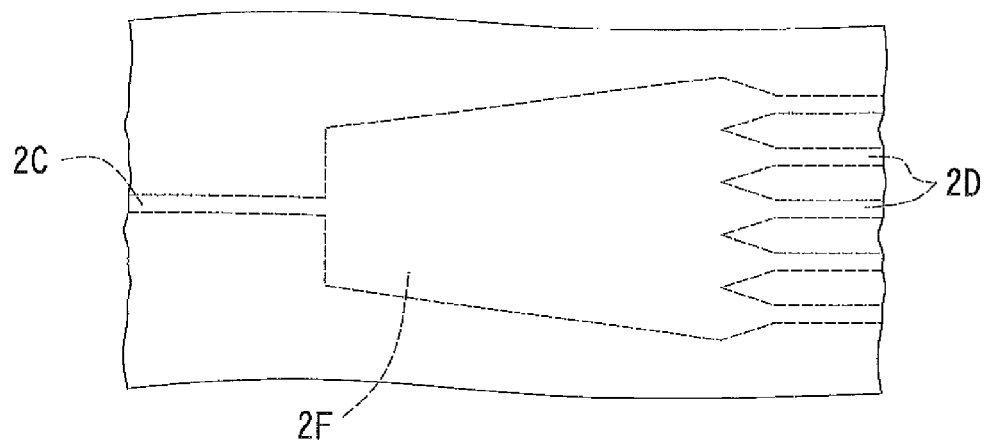
FIGS. 4A to 4C are schematic plan views showing variations of a branched core pattern.
Figure 4B:
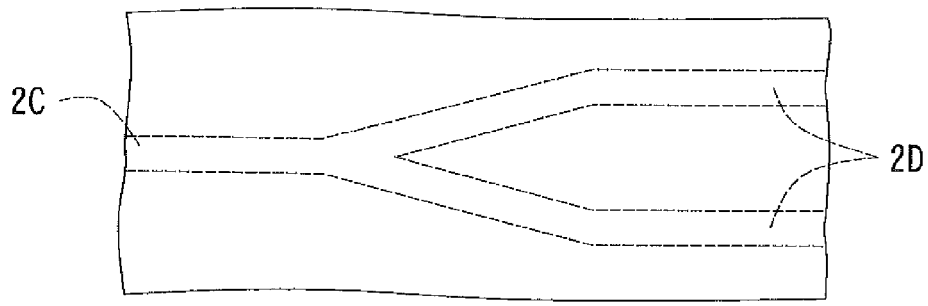
Figure 4C:
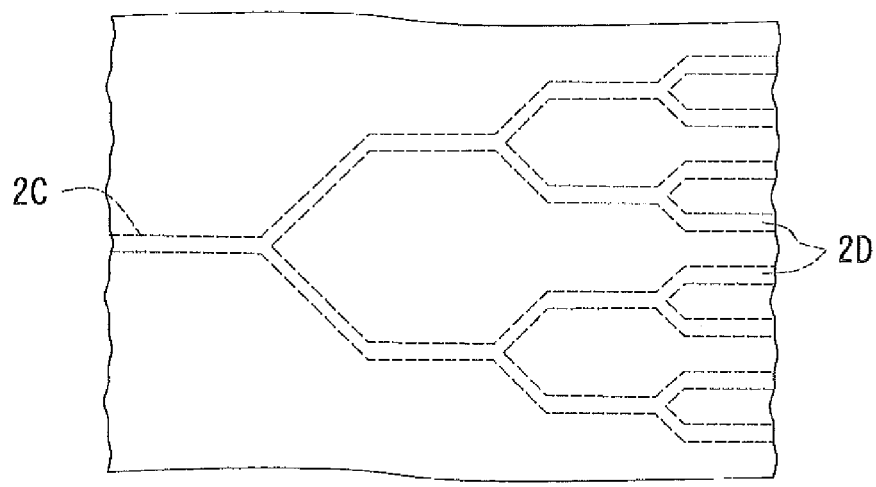

In the second embodiment, the branched core pattern is such that the single core 2C is branched into the plurality of cores 2D via the generally isosceles triangular portion 2E, but may be such that a generally trapezoidal portion 2F is provided instead of the generally isosceles triangular portion 2E as shown in FIG. 4A. Further, the branched core pattern may be a so-called Y-branched pattern such that the single core 2C is branched into two cores 2D as shown in FIG. 4B, or may include a plurality of Y-branched patterns in combination as shown in FIG. 4C.

The connector optical waveguide including the cores 2C, 2D of the branched pattern may be used, for example, for connection between a single CPU and a plurality of memories. In this case, the same signals are simultaneously transmitted to the plurality of memories from the single CPU.

Figure 5A:
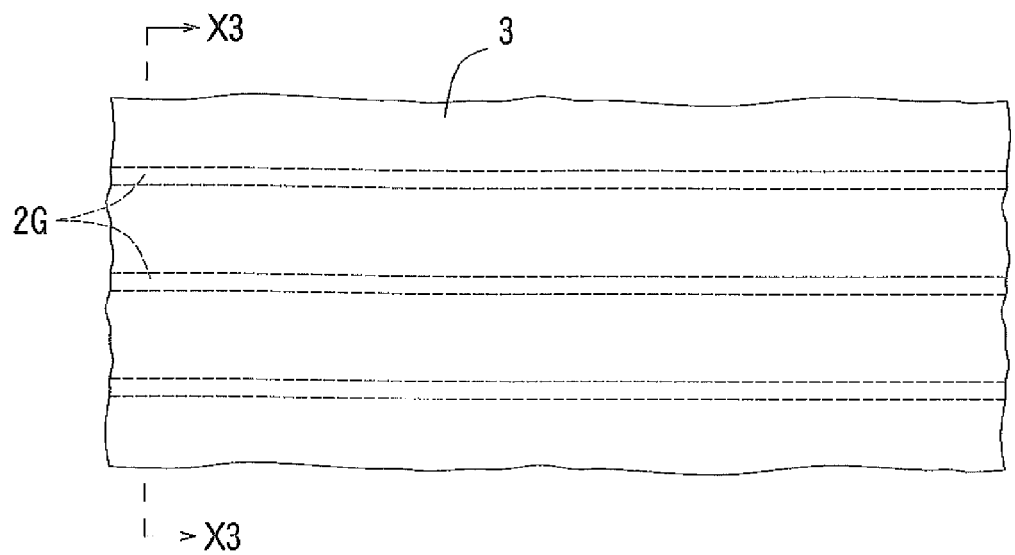
FIGS. 5A and 5B are a plan view and an enlarged X3-X3 sectional view, respectively, which schematically illustrate a connector optical waveguide produced by a connector optical waveguide production method according to a third embodiment.
Figure 5B:
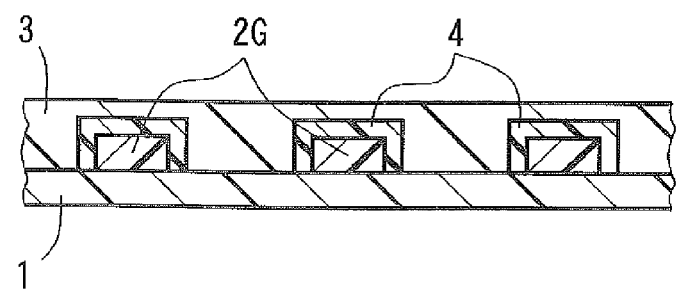

FIGS. 5A and 5B are a plan view and an X3-X3 sectional view, respectively, which illustrate a connector optical waveguide produced by a connector optical waveguide production method according to a third embodiment. The connector optical waveguide has substantially the same construction as in the first embodiment shown in FIGS. 1A and 1B, except that a plurality of linear cores 2G (three cores 2G in FIG. 5A) are provided parallel to each other.

In this embodiment, the connector optical waveguide is produced as having mixed layers 4 in portions of the cores 2G of the parallel pattern adjacent to interfaces between the cores 2G and the over-cladding layer 3 by the same method shown in FIGS. 2A to 2D.

A connector optical waveguide (not shown) including cores 2A to 2D arranged in a combination of the crossing pattern and the branched pattern may be produced by a connector optical waveguide production method according to a fourth embodiment.

The connector optical waveguides produced by the connector optical waveguide production methods according to the first to fourth embodiments are cut by means of a dicing saw or a laser so as to be properly trimmed. Then, an optical waveguide connector is produced by mounting a ferrule (connecting part) having a connecting function onto any of the connector optical waveguides. The ferrule preferably has a configuration connectable to an MT ferrule specified by IEC 61754-5, or a PMT ferrule specified by JPCA-PE03-01-07S. Another exemplary method for trimming the connector optical waveguides is to pattern the under-cladding layer and the over-cladding layer by a photolithography process.

Next, Inventive Examples will be described in conjunction with Comparative Examples. It should be understood that the present invention be not limited to these inventive examples.

EXAMPLES

Under-Cladding Layer Material and Over-Cladding Layer Material (of Solvent-Type)

Component A (solid epoxy resin): an epoxy resin containing an aromatic ring skeleton (EPICOAT 1002 available from Mitsubishi Chemical Corporation)
Component B (solid epoxy resin): an epoxy resin containing an alicyclic skeleton (EHPE 3150 available from Daicel Chemical Industries, Ltd.)
Component C (photoacid generator): a 50% propione carbonate solution of a triarylsulfonium salt (CPI-200K available from San Apro Ltd.)

A photosensitive resin composition was prepared as an under-cladding layer material and an over-cladding layer material by dissolving 70 parts by weight of Component A, 30 parts by weight of Component B, and 2 parts by weight of Component C in 55 parts by weight of ethyl lactate (available from Musashino Chemical Laboratory, Ltd.) with stirring at a temperature of 80° C. at a stirring speed of 250 rmp for 3 hours. The photosensitive resin composition thus prepared had a viscosity of 1320 mPa·s as measured by a Brookfield's digital viscometer (HBDV-I+CP).

Core Material
Component D: o-cresol novolak glycidyl ether (YDCN-700-10 available from Shinnittetsu Kagaku K.K.)

A photosensitive resin composition was prepared as a core material by dissolving 100 parts by weight of Component D and 1 part by weight of Component C in 60 parts by weight of ethyl lactate (available from Musashino Chemical Laboratory, Ltd.) with stirring at a temperature of 80° C. at a stirring speed of 250 rmp for 3 hours. The photosensitive resin composition thus prepared had a viscosity of 1900 mPa·s as measured by the digital viscometer described above.

Example 1

Formation of Under-Cladding Layer

The under-cladding layer material was applied onto a surface of a glass substrate (available from Central Glass Co., Ltd. and having a size of 140 mm×140 mm×1.1 mm (thickness)) by means of a spin coater (1X-DX2 available from Mikasa Co., Ltd.) and dried at 130° C. for 10 minutes to form a coating layer. In turn, the coating layer was entirely irradiated with ultraviolet radiation (at a wavelength of 365 nm) at a cumulative dose of 2000 mJ/cm² by means of an exposure machine (MA-60F available from Mikasa Co., Ltd.) and an ultra-high pressure mercury lamp (USH-250D available from Ushio Inc.) for exposure. Then, the resulting coating film was heat-treated at 130° C. for 10 minutes. Thus, an under-cladding layer was formed.

Formation of Cores

Next, the core material was applied onto a surface of the under-cladding layer by means of the spin coater, and then dried at 130° £ for 5 minutes to form a photosensitive resin layer. In turn, the photosensitive resin layer was exposed via a photomask by irradiation with ultraviolet radiation (at a wavelength of 365 nm) at a cumulative dose of 4000 mJ/cm² by means of the exposure machine and the ultra-high pressure mercury lamp, and then heat-treated 130° C. for 15 minutes. Thereafter, a development process (dipping development process) was performed by dipping the resulting photosensitive resin layer in a developing liquid of γ-butyrolactone (available from Mitsubishi Chemical Corporation) for 3 minutes, whereby an unexposed portion of the photosensitive resin layer was dissolved away. Then, the resulting photosensitive resin layer was heat-treated at 120° C. for 10 minutes. Thus, cores 2A, 2B were formed in a crossing pattern, and a core 2 was formed in a linear pattern (see FIG. 6).

The crossing pattern was such that 30 parallel cores 2B crossed a single linear core 2A at an angle of 90 degrees. The 30 parallel cores 2B were spaced 0.2 mm from one another. The linear pattern was such that the single core 2 extends parallel to the linear core 2A. The cores 2A, 2B, 2 each had a height of 50 μm and a width of 50 μm.

Formation of Mixed Layers and Over-Cladding Layer

The over-cladding layer material was applied over the cores 2A, 2B, 2 onto the surface of the under-cladding layer by means of the spin coater to form an over-cladding layer formation photosensitive resin layer, and then heat-treated at 70° C. for 10 minutes. Mixed layers 4 (see FIG. 6) were formed in interfaces between the cores 2A, 2B, 2 and the photosensitive resin layer by the heat treatment. In turn, the resulting photosensitive resin layer was exposed by irradiation with ultraviolet radiation (at a wavelength of 365 nm) at a cumulative dose of 2000 mJ/cm² by means of the exposure machine and the ultra-high pressure mercury lamp, and then heat-treated at 130° C. for 10 minutes. Thus, an over-cladding layer 3 (see FIG. 6) was formed.

Figure 6:
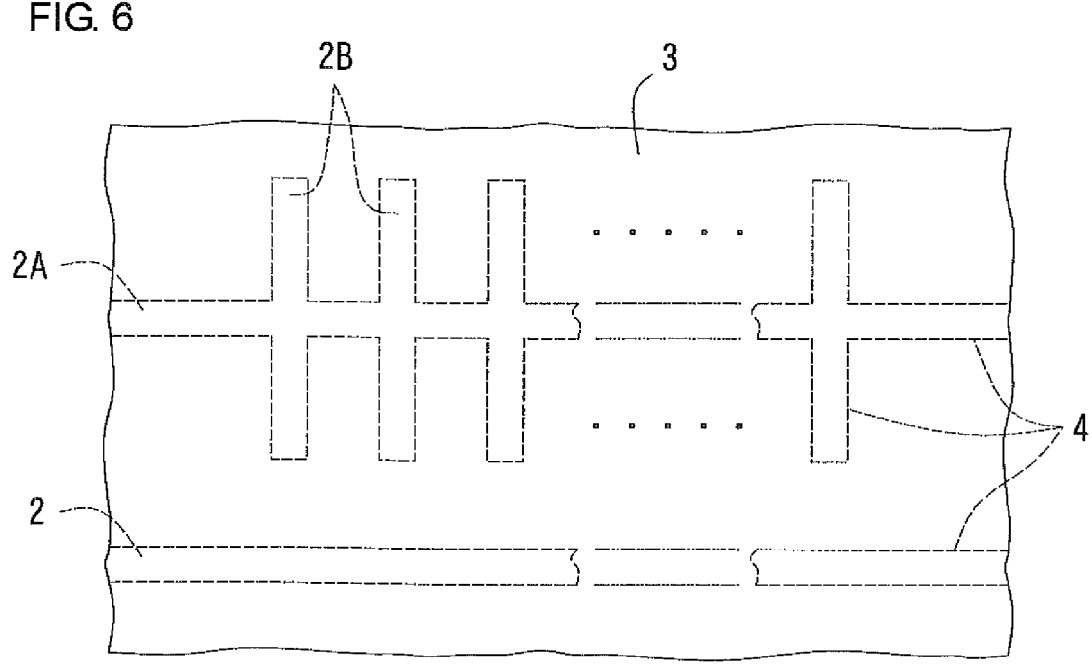
FIG. 6 is a schematic plan view showing connector optical waveguides of Examples 1 to 12 and 37 to 48, and Comparative Examples 1 to 4 and 13 to 16.

Thereafter, the glass substrate was removed from the under-cladding layer. Thus, a film-shaped connector optical waveguide was produced, which included the under-cladding layer 1, the cores 2A, 2B, 2, the mixed layers 4 and the over-cladding layer 3 as shown in FIG. 6. Then, the connector optical waveguide was bonded onto a dicing tape (UE-111AJ available from Nitto Denko Corporation), and cut to a length of 30 mm at a cutting rate of 0.3 mm/second so as to contain all intersections of the crossing pattern by means of a dicing saw (DAD522 available from Disco Corporation) and a dicing blade (NBC-Z2050 available from Disco Corporation and having a size of 50.6×0.025×40 m), whereby longitudinally opposite end faces of the linear core 2A of the crossing pattern and the core 2 of the linear pattern were exposed.

Example 2

A connector optical waveguide having a length of 30 mm was produced in substantially the same, manner as in Example 1, except that the heat treatment (for the formation of the mixed layers) was performed at 100° C. for 10 minutes before the irradiation with the ultraviolet radiation in the over-cladding layer forming step.

Example 3

A connector optical waveguide having a length of 30 mm was produced in substantially the same manner as in Example 1, except that the heat treatment (for the formation of the mixed layers) was performed at 130° C. for 10 minutes before the irradiation with the ultraviolet radiation in the over-cladding layer forming step.

Comparative Example 1

A connector optical waveguide having a length of 30 mm was produced in substantially the same manner as in Example 1, except that the heat treatment (for the formation of the mixed layers) was performed at 150° C. for 10 minutes before the irradiation with the ultraviolet radiation in the over-cladding layer forming step.

Example 4

A colorless transparent PET substrate (Model No. 188 of Type T60 available from TORAY Industries, Inc., and having a thickness of 188 μm) was prepared. A connector optical waveguide having a length of 30 mm was produced in substantially the same manner as in Example 1, except that the under-cladding layer, the cores 2A, 2B, 2, the mixed layers 4 and the over-cladding layer 3 were formed on a surface of the PET substrate.

Example 5

A connector optical waveguide having a length of 30 mm was produced in substantially the same manner as in Example 4, except that the heat treatment (for the formation of the mixed layers) was performed at 100° C. for 10-minutes before the irradiation with the ultraviolet radiation in the over-cladding layer forming step.

Example 6

A connector optical waveguide having a length of 30 mm was produced in substantially the same manner as in Example 4, except that the heat treatment (for the formation of the mixed layers) was performed at 130° C. for 10 minutes before the irradiation with the ultraviolet radiation in the over-cladding layer forming step.

Comparative Example 2

An attempt was made to produce a connector optical waveguide in substantially the same manner as in Example 4, except that the heat treatment (for the formation of the mixed layers) was performed at 150° C. for 10 minutes before the irradiation with the ultraviolet radiation in the over-cladding layer forming step. However, it was impossible to produce the connector optical waveguide, because a laminate including the PET substrate, the under-cladding layer, the cores 2A, 2B, 2 and the over-cladding layer formation photosensitive resin layer was distorted.

Example 7

A colorless transparent PEN substrate (Model No. C4368 of Type Q51 available from Teijin DuPont Films Limited, and having a thickness of 188 μm) was prepared. A connector optical waveguide having a length of 30 mm was produced in substantially the same manner as in Example 1, except that the under-cladding layer, the cores 2A, 2B, 2, the mixed layers 4 and the over-cladding layer 3 were formed on a surface of the PEN substrate.

Example 8

A connector optical waveguide having a length of 30 mm was produced in substantially the same manner as in Example 7, except that the heat treatment (for the formation of the mixed layers) was performed at 100° C. for 10 minutes before the irradiation with the ultraviolet radiation in the over-cladding layer forming step.

Example 9

A connector optical waveguide having a length of 30 mm was produced in substantially the same manner as in Example 7, except that the heat treatment (for the formation of the mixed layers) was performed at 130° C. for 10 minutes before the irradiation with the ultraviolet radiation in the over-cladding layer forming step.

Comparative Example 3

An attempt was made to produce a connector optical waveguide in substantially the same manner as in Example 7, except that the heat treatment (for the formation of the mixed layers) was performed at 150° C. for 10 minutes before the irradiation with the ultraviolet radiation in the over-cladding layer forming step. However, it was impossible to produce the connector optical waveguide, because a laminate including other PEN substrate, the under-cladding layer, the cores 2A, 2B, 2 and the over-cladding layer formation photosensitive resin layer was distorted, Example 10

A stainless steel substrate of a SUS304 foil (available from Toyo Seihaku Co., Ltd., and having a thickness of 20 μm) was prepared. A connector optical waveguide having a length of 30 mm was produced in substantially the same manner as in Example 1, except that the under-cladding layer, the cores 2A, 23, 2, the mixed layers 4 and the over-cladding layer 3 were formed on a surface of the stainless steel substrate.

Example 11

A connector optical waveguide having a length of 30 mm was produced in substantially the same manner as in Example 10, except that the heat treatment (for the formation of the mixed layers) was performed at 100° C. for 10 minutes before the irradiation with the ultraviolet radiation in the over-cladding layer forming step.

Example 12

A connector optical waveguide having a length of 30 mm was produced in substantially the same manner as in Example 10, except that the heat treatment (for the formation of the mixed, layers) was performed at 130° C. for 10 minutes before the irradiation with the ultraviolet radiation in the over-cladding layer forming step.

Comparative Example 4

A connector optical waveguide having a length of 30 mm was produced in substantially the same manner as in Example 10, except that the heat treatment (for the formation of the mixed layers) was performed at 150° C. for 10 minutes before the irradiation with the ultraviolet radiation in the over-cladding layer forming step.

Measurement of Light Intensity Distribution

Figure 7:
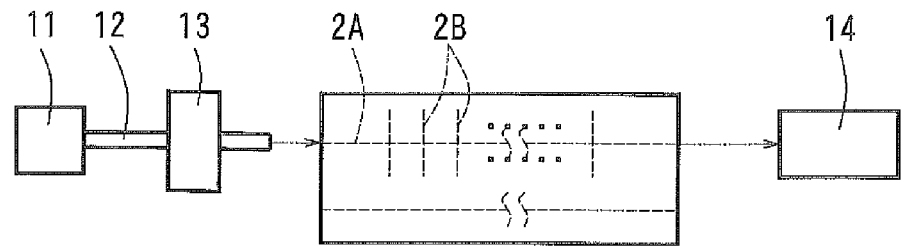
FIG. 7 is a diagram for explaining how to measure a light intensity distribution.

A light intensity distribution in the linear core 2A of the crossing pattern in each of the 30-mm long connector optical waveguides of Examples 1 to 12 and Comparative Examples 1 and 4 was measured by means of a light beam measurement system (LEPAS-12 available from Hamamatsu Photonics Co. Ltd.) 14 as shown in FIG. 7. Since it was impossible to provide the connector optical waveguides of Comparative Examples 2 and 3, the measurement was not carried out for Comparative Examples 2 and 3. A VCSEL (OP250 available from Miki Inc.) capable of emitting light at a wavelength of 850 nm was used as a light source 11. The light emitted from the light source 11 was guided to an input end face of the core 2A via a 5-μmϕ graded multimode fiber 12. Further, a mode scrambler (0600123 available from Diamond Co., Ltd.) 13 was disposed in the fiber 12 for proper excitation conditions. In FIG. 7, cores 2A, 2B, 2 are shown by broken lines, and the thicknesses of the cores 2A, 2B, 2 are indicated by the thicknesses of the broken lines.

Mixed Layer Percentage

The percentage of the area of the mixed layer in the cross section of the core 2A was calculated based on the measurement of the light intensity distribution. The calculation results are shown below in Table 1.

Calculation of Optical Excess Loss Occurring due to Crossing

Figure 8A:
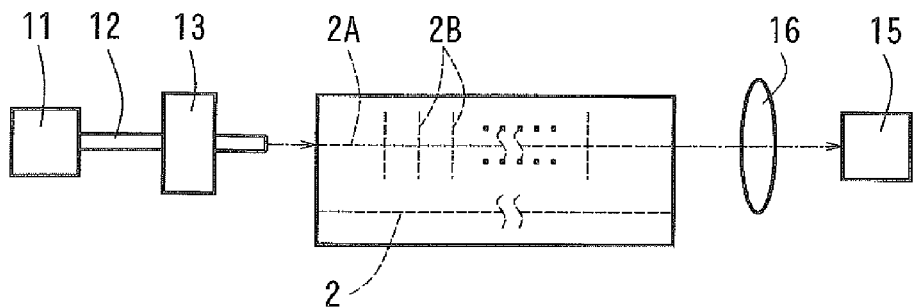
FIGS. 8A and 8B are diagrams for explaining how to measure a light transmission loss.
Figure 8B:
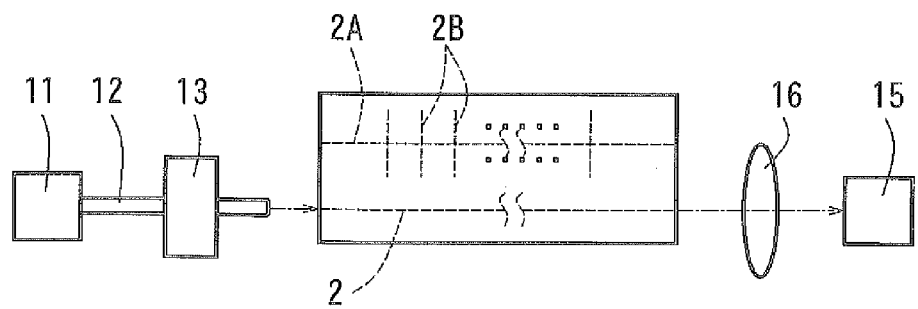

The light transmission loss (total, loss) of each of the 30-mm long connector optical waveguides of Examples 1 to 12 and Comparative Examples 1 and 4 was measured by means of an optical multi-power meter (Q822 available from Advantest Corporation) 15 as shown in FIGS. 8A and 8B. Since it was impossible to provide the connector optical waveguides of Comparative Examples 2 and 3, the measurement was not carried out for Comparative Examples 2 and 3. The light source 11, the fiber 12 and the mode scrambler 13 described above were used for the measurement of the light transmission loss. Further, a lens 16 was disposed between an outlet end face and the optical multi-power meter 15. In FIGS. 8A and 8B, the cores 2A, 2B, 2 are indicated by broken lines; and the thicknesses of the cores 2A, 2B, 2 are indicated by the thicknesses of the broken lines.

As shown in FIG. 8A, the light emitted from the light source 11 was inputted to the input end fate of the linear core 2A of the crossing pattern via the mode scrambler 13 and outputted from the output end face. The outputted light was inputted to the optical multi-power meter 15 via the lens 16, and the total loss A of the single linear core 2A of the crossing pattern was measured. Then, as shown in FIG. 8B, the light emitted from the light source 11 was inputted to the optical multi-power meter 15 via the mode scrambler 13, the core 2 of the linear pattern and the lens 16, and the total loss B of the core 2 of the linear pattern was measured. A value obtained by subtracting the total loss B of the core 2 of the linear pattern from the total loss A of the linear core 2A of the crossing pattern was defined as an optical excess loss occurring due to the crossing (crossing loss). The crossing losses of the connector optical waveguides are shown below in Table 1.

Comprehensive Evaluation

In consideration of the results of the evaluation of the crossing loss and the light intensity distribution, a connector optical waveguide rated as excellent is indicated by "A" and a connector optical waveguide rated as particularly excellent is, indicated by "AA" in Table 1. Further, a connector optical waveguide rated as inferior is: indicated by "B" in Table 1.

TABLE 1

(Solvent type/Crossing pattern)

| | Material for substrate | Mixed layer formation Temperature (° C.) | Mixed layer percentage (%) | Crossing loss (dB) | Comprehensive evaluation |
|---|---|---|---|---|---|
| Example 1 | Glass | 70 | 35.9 | 2.0 | A |
| Example 2 | | 100 | 62.7 | 0.7 | AA |
| Example 3 | | 130 | 73.7 | 0.3 | AA |
| Comparative Example 1 | | 150 | 91.5 | 3.0 | B |
| Example 4 | PET | 70 | 35.9 | 2.5 | A |
| Example 5 | | 100 | 62.7 | 0.9 | AA |
| Example 6 | | 130 | 73.7 | 0.5 | AA |
| Comparative Example 2 | | 150 | — | — | B |
| Example 7 | PEN | 70 | 35.9 | 2.7 | A |
| Example 8 | | 100 | 62.7 | 1.0 | AA |
| Example 9 | | 130 | 73.7 | 0.4 | AA |
| Comparative Example 3 | | 150 | — | — | B |
| Example 10 | Stainless steel | 70 | 35.9 | 2.8 | A |
| Example 11 | | 100 | 62.7 | 0.8 | AA |
| Example 12 | | 130 | 73.7 | 0.5 | AA |
| Comparative Example 4 | | 150 | 91.5 | 1.0 | B |

Examples 13 to 24 and Comparative Examples 5 to 8

Figure 9:
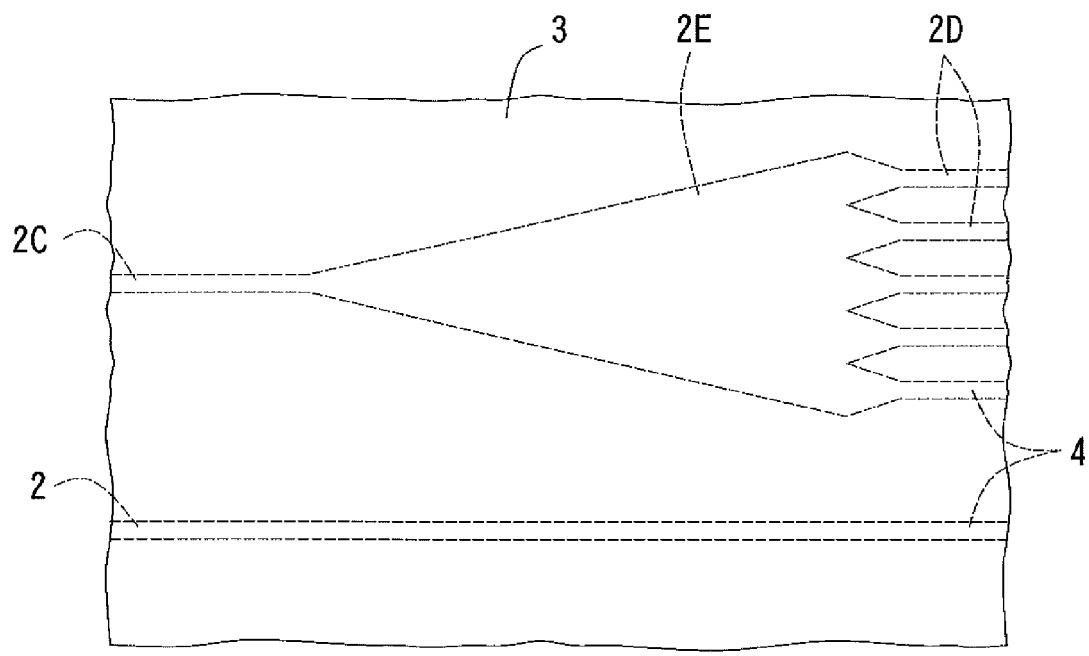
FIG. 9 is a schematic plan view showing connector optical waveguides of Examples 13 to 24 and 49 to 60, and Comparative Examples 5 to 8 and 17 to 20.
Figure 10A:
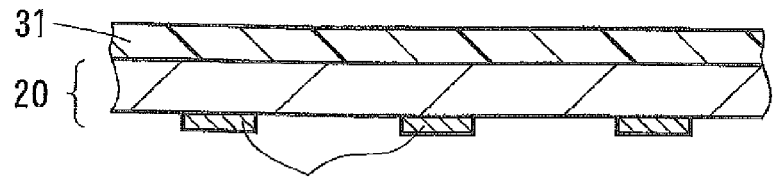
FIGS. 10A to 10D are schematic diagrams for explaining the step of forming an optical waveguide in an opto-electric hybrid board.
Figure 10B:
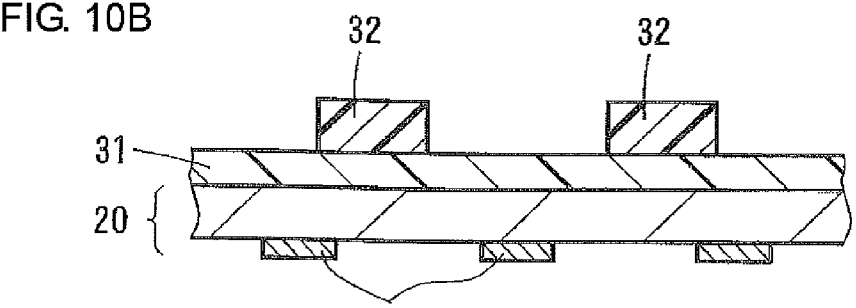
Figure 10C:
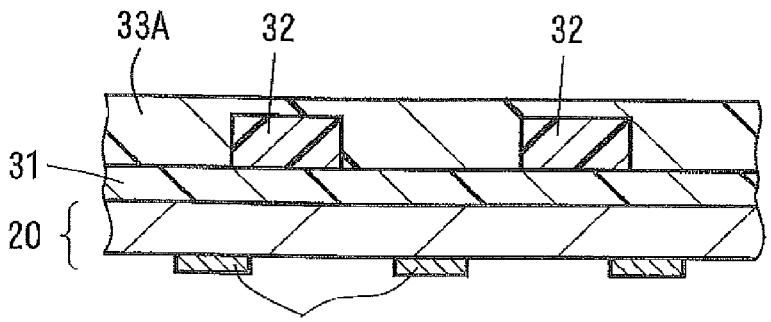
Figure 10D:
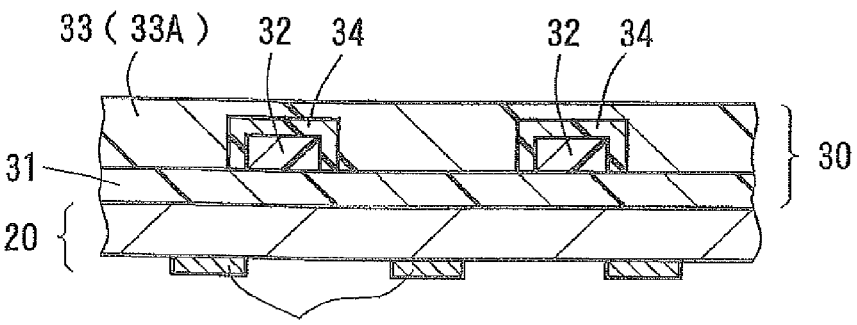

Connector optical waveguide production processes according to Examples 13 to 24 and Comparative Examples 5 to 8, were performed in substantially the same, manner as in Examples 1 to 12 and Comparative Examples 1 to 4, respectively, except that cores 2C, 2D of a branched pattern and a core 2 of a linear pattern were formed as shown in FIG. 9. In the branched pattern, a single linear core 2C having a constant width of 50 μm was connected at its distal end to a generally isosceles triangular portion 2E diverged at an angle of 4 degrees as having a progressively increasing width, and the generally isosceles triangular portion 2E was branched into five core portions each tapered at a taper angle of 2 degrees as having a progressively decreasing width and respectively connected to linear cores 2D each having a constant width of 50 μm. The cores 2C, 2D, 2 each had a height of 50 μm.

Then, the measurement of the light intensity distribution, the calculation of the mixed layer percentage, the calculation of the optical excess loss occurring due to the branching (branching loss), and the comprehensive evaluation were carried out in the same manner as described above. The results are shown below in Table 2. In the measurement of the light intensity distribution and the calculation of the branching loss, light outputted from one of the five branch cores 2D was inputted to the light beam measurement system 14 and the optical multi-power meter 15.

TABLE 2

(Solvent type/Branched pattern)

| | Material for substrate | Mixed layer formation Temperature (° C.) | Mixed layer percentage (%) | Branching loss (dB) | Comprehensive evaluation |
|---|---|---|---|---|---|
| Example 13 | Glass | 70 | 35.9 | 0.6 | A |
| Example 14 | | 100 | 62.7 | 0.5 | A |

TABLE 2-continued (Solvent type/Branched pattern)

| | Material for substrate | Mixed layer formation Temperature (° C.) | Mixed layer percentage (%) | Branching loss (dB) | Comprehensive evaluation |
|---|---|---|---|---|---|
| Example 15 | | 130 | 73.7 | 0.5 | AA |
| Comparative Example 5 | | 150 | 91.5 | 2.8 | B |
| Example 16 | PET | 70 | 35.9 | 0.9 | A |
| Example 17 | | 100 | 62.7 | 0.7 | A |
| Example 18 | | 130 | 73.7 | 0.5 | AA |
| Comparative Example 6 | | 150 | — | — | B |
| Example 19 | PEN | 70 | 35.9 | 0.7 | A |
| Example 20 | | 100 | 62.7 | 0.7 | A |
| Example 21 | | 130 | 73.7 | 0.5 | AA |
| Comparative Example 7 | | 150 | — | — | B |
| Example 22 | Stainless steel | 70 | 35.9 | 1.0 | A |
| Example 23 | | 100 | 62.7 | 0.9 | A |
| Example 24 | | 130 | 73.7 | 0.7 | AA |
| Comparative Example 8 | | 150 | 91.5 | 3.4 | B |

Examples 25 to 36 and Comparative Examples 9 to 12

Connector optical waveguide production processes according to Examples 25 to 36 and Comparative Examples 9 to 12 were performed in substantially the same manner as in Examples 1 to 12 and Comparative Examples 1 to 4, respectively, except that three linear cores 2G were formed parallel to each other (see FIGS. 5A and 5B). The cores 2G each had a height of 50 µm and a width of 50 µm.

Then, the measurement of the light intensity distribution and the calculation of the mixed layer percentage were carried out in the same manner as described above. The results are shown below in Table 3. In the measurement of the light intensity distribution, light emitted from the light source 11 was inputted to one of the cores 2G, and light outputted from the one core 2G was inputted to the light beam measurement system 14.

TABLE 3

(Solvent type/Linear pattern)

| | Material for substrate | Mixed layer formation Temperature (° C.) | Mixed layer percentage (%) |
|---|---|---|---|
| Example 25 | Glass | 70 | 35.9 |
| Example 26 | | 100 | 62.7 |
| Example 27 | | 130 | 73.7 |
| Comparative Example 9 | | 150 | 91.5 |
| Example 28 | PET | 70 | 35.9 |
| Example 29 | | 100 | 62.7 |
| Example 30 | | 130 | 73.7 |
| Comparative Example 10 | | 150 | — |
| Example 31 | PEN | 70 | 35.9 |
| Example 32 | | 100 | 62.7 |
| Example 33 | | 130 | 73.7 |
| Comparative Example 11 | | 150 | — |
| Example 34 | Stainless steel | 70 | 35.9 |
| Example 35 | | 100 | 62.7 |
| Example 36 | | 130 | 73.7 |
| Comparative Example 12 | | 150 | 91.5 |

Examples 37 to 48 and Comparative Examples 13 to 16

The following under-cladding layer. Material and over-cladding layer material were prepared, and the same core material as used in Examples 1 to 12 and Comparative Examples 1 to 4 were prepared.
Under-Cladding Layer Material of Solvent Type
Component B (solid epoxy resin): 65 parts by weight of an epoxy resin containing an alicyclic skeleton (EHPE3150 available from Daicel Chemical Industries, Ltd.)
Component C (photoacid generator): 1 part by weight of a 50% propione carbonate solution of a triarylsulfonium, salt (CPI-200K available from San Apro Ltd.)
A photosensitive resin composition was prepared as an under-cladding layer material by dissolving Components B and C in 35 parts by weight of cyclohexanone (available from Wako Pure Chemical Industries, Ltd.) with stirring at a temperature of 80° C. at a stirring speed of 250 rmp for 3 hours. The photosensitive resin composition thus prepared had a viscosity of 1800 mPa·s as measured by the digital viscometer described above.
Over-Cladding Layer Material of Non-Solvent Type
Component E (liquid epoxy resin): 100 parts by weight of an epoxy resin containing an alicyclic skeleton (ADEKA RESIN EP4080E available from Adeka Corporation)
A photosensitive resin composition was prepared as an over-cladding layer material by mixing Components E and C at a temperature of 60° C. with stirring in an ultrasonic cleaner for 2 hours. The photosensitive resin composition thus prepared had a viscosity of 1850 mPa·s as measured by the digital viscometer described above.
Formation of Under-Cladding Layer
The under-cladding layer material was applied onto a surface of each of the various types of substrates used in Examples 1 to 12 and Comparative Examples 1 to (see Table 4) by means of a spin coater (1X-DX2 available from Mikasa Co., Ltd.) and dried at 100° C. for 5 minutes to form a coating layer. In turn, the coating layer was entirely irradiated with ultraviolet radiation (at a wavelength of 365 nm) at a cumulative dose of 2000 mJ/cm$^2$ by means of an exposure machine (MA-60F available from Mikasa Co., Ltd.) and an ultra-high pressure mercury lamp (USH-250D available from Ushio Inc.) for exposure. Then, the resulting coating film was heat-treated at 100° C. for 5 minutes. Thus, an under-cladding layer was formed.
Formation of Cores
Cores 2A, 2B of a crossing pattern and a core 2 of a linear pattern were formed in substantially the same manner as in Examples 1 to 12 and Comparative Examples 1 to 4 (see FIG. 6).
Formation of Mixed Layers and Over-Cladding Layer
The over-cladding layer material was applied over the cores 2A, 2B, 2 onto the surface of the under-cladding layer by means of the spin coater to form an over-cladding layer formation photosensitive resin layer, which was in turn heat-treated at different temperatures shown in Table A for minutes, Mixed layers 4 (see FIG. 6) were formed in portions of the cores 2A, 2B, 2 adjacent to interfaces between the cores 2A, 2B, 2 and the photosensitive resin layer by the heat treatment. In turn, the resulting photosensitive resin layer was exposed by irradiation with ultraviolet radiation (at a wavelength of 365 nm) at a cumulative dose of 1000 mJ/cm$^2$ by means of the exposure machine and the ultra-high pressure mercury lamp, and then heat-treated at 120° C. for 10 minutes. Thus, an over-cladding layer 3 (see FIG. 6) was formed.

Then, a 30-mm long connector optical waveguide was produced in the same manner as described above. The measurement of the light intensity distribution, the calculation of the mixed layer percentage, the calculation of the optical excess loss occurring due to the crossing (crossing loss), and the comprehensive evaluation were carried out in the same manner as described above. The results are shown below in Table 4.

TABLE 4

(Non-solvent type/Crossing pattern)

| | Material for substrate | Mixed layer formation Temperature (° C.) | Mixed layer percentage (%) | Crossing loss (dB) | Comprehensive evaluation |
|---|---|---|---|---|---|
| Example 37 | Glass | 90 | 24.6 | 2.8 | A |
| Example 38 | | 100 | 35.6 | 2.6 | A |
| Example 39 | | 120 | 53.9 | 0.8 | AA |
| Comparative Example 13 | | 150 | 87.0 | 0.4 | B |
| Example 40 | PET | 90 | 24.6 | 4.0 | A |
| Example 41 | | 100 | 35.6 | 2.9 | A |
| Example 42 | | 120 | 53.9 | 1.1 | AA |
| Comparative Example 14 | | 150 | — | — | B |
| Example 43 | PEN | 90 | 24.6 | 3.2 | A |
| Example 44 | | 100 | 35.6 | 2.7 | A |
| Example 45 | | 120 | 53.9 | 1.0 | AA |
| Comparative Example 15 | | 150 | — | — | B |
| Example 46 | Stainless steel | 90 | 24.6 | 3.8 | A |
| Example 47 | | 100 | 35.6 | 2.9 | A |
| Example 48 | | 120 | 53.9 | 1.2 | AA |
| Comparative Example 16 | | 150 | 87.0 | 1.0 | B |

Examples 49 to 60 and Comparative Examples 17 to 20

Connector optical waveguide production processes according to Examples 49 to 60 and Comparative Examples 17 to 20 were performed in substantially the same manner as in Examples 37 to 48 and Comparative Examples 13 to 16, respectively, except that cores 2C, 2D of a branched pattern and a core 2 of a linear pattern were formed as in Examples 13 to 24 and Comparative Examples 5 to 8 (see FIG. 9).

Then, the measurement of the light intensity distribution, the calculation of the mixed layer percentage, the calculation of the optical excess loss occurring due to the branching (branching loss), and the comprehensive evaluation were carried out. The results are shown below in Table 5.

TABLE 5

(Non-solvent type/Branched pattern)

| | Material for substrate | Mixed layer formation Temperature (° C.) | Mixed layer percentage (%) | Branching loss (dB) | Comprehensive evaluation |
|---|---|---|---|---|---|
| Example 49 | Glass | 90 | 24.6 | 0.8 | A |
| Example 50 | | 100 | 35.6 | 0.4 | AA |
| Example 51 | | 120 | 53.9 | 0.4 | AA |
| Comparative Example 17 | | 150 | 87.0 | 1.5 | B |
| Example 52 | PET | 90 | 24.6 | 1.0 | A |
| Example 53 | | 100 | 35.6 | 0.5 | AA |
| Example 54 | | 120 | 53.9 | 0.5 | AA |
| Comparative Example 18 | | 150 | — | — | B |

TABLE 5-continued (Non-solvent type/Branched pattern)

| | Material for substrate | Mixed layer formation Temperature (° C.) | Mixed layer percentage (%) | Branching loss (dB) | Comprehensive evaluation |
|---|---|---|---|---|---|
| Example 55 | PEN | 90 | 24.6 | 0.9 | A |
| Example 56 | | 100 | 35.6 | 0.5 | AA |
| Example 57 | | 120 | 53.9 | 0.5 | AA |
| Comparative Example 19 | | 150 | — | — | B |
| Example 58 | Stainless steel | 90 | 24.6 | 1.2 | A |
| Example 59 | | 100 | 35.6 | 0.6 | AA |
| Example 60 | | 120 | 53.9 | 0.6 | AA |
| Comparative Example 20 | | 150 | 87.0 | 1.9 | B |

Examples 61 to 72 and Comparative Examples 21 to 24

Connector optical waveguide production processes according to Examples 61 to 72 and Comparative Examples 21 to 24 were performed in substantially the same manner as in Examples 37 to 48 and Comparative Examples 13 to 16, respectively, except that cores 2G were formed in a linear pattern as in Examples 25 to 36 and Comparative Examples 9 to 12 (see FIGS. 5A and 5B).

Then, the measurement of the light intensity distribution and the calculation of the mixed layer percentage were carried out in the same manner as described above. The results are shown below in Table 6.

TABLE 6

(Non-solvent type/Linear pattern)

| | Material for substrate | Mixed layer formation Temperature (° C.) | Mixed layer percentage (%) |
|---|---|---|---|
| Example 61 | Glass | 90 | 24.6 |
| Example 62 | | 100 | 35.6 |
| Example 63 | | 120 | 53.9 |
| Comparative Example 21 | | 150 | 87.0 |
| Example 64 | PET | 90 | 24.6 |
| Example 65 | | 100 | 35.6 |
| Example 66 | | 120 | 53.9 |
| Comparative Example 22 | | 150 | — |
| Example 67 | PEN | 90 | 24.6 |
| Example 68 | | 100 | 35.6 |
| Example 69 | | 120 | 53.9 |
| Comparative Example 23 | | 150 | — |
| Example 70 | Stainless steel | 90 | 24.6 |
| Example 71 | | 100 | 35.6 |
| Example 72 | | 120 | 53.9 |
| Comparative Example 24 | | 150 | 87.0 |

As can be understood from Tables 1 to 6, the mixed layer percentage was reduced when the temperature the heat treatment performed before the irradiation with the ultraviolet radiation was in the range of 70° C. to 130° C. in the overcladding layer formation step in the methods of producing a connector optical waveguide including cores formed in the crossing pattern, the branched pattern or the linear pattern. Further, the cores formed in the crossing pattern each had a reduced crossing loss, and the cores formed in the branched pattern each had a reduced branching loss.

Further, the connector optical waveguide production processes of Examples 1 to 72 were performed by employing different heat treatment periods for the heat treatment before the irradiation with the ultraviolet radiation in the over-cladding layer formation step. As a result, a further reduced mixed layer percentage was observed when the heat treatment period was 1 to 20 minutes.

The connector optical waveguide production method according to the present invention can be employed for production of a film-shaped connector optical waveguide which connects components (e.g., information processing components, information transmitting components and the like) to each other for light transmission between these components.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. A production method of an optical waveguide for a connector comprising:

forming an under-cladding layer on a surface of a substrate;

forming a core in a crossing pattern on a surface of the under-cladding layer;

forming an over-cladding layer formation photosensitive resin layer over the core comprised of a photosensitive resin composition containing an organic solvent for adjustment of viscosity;

performing a heat treatment at a temperature of 70° C. to 130° C. to form a mixed layer of a mixture of a core material and a photosensitive resin layer material in an interface between the core and the photosensitive resin layer;

exposing a part of the photosensitive resin layer by irradiation with radiation to form an over-cladding layer from the exposed part; and removing the substrate from the under-cladding layer to provide a film-shaped optical waveguide connector including the under-cladding layer, the core, the mixed layer and the over-cladding layer.

2. The connector optical waveguide production method according to claim 1, wherein the heat treatment is performed for a period of 1 to 20 minutes.

* * * * *